United States Patent
Wakizaka et al.

(10) Patent No.: US 6,428,417 B2
(45) Date of Patent: Aug. 6, 2002

(54) FLOW PASSAGE STRUCTURE FOR SHAFT-PRESS-FITTED FLANGE MEMBERS

(75) Inventors: Naoyuki Wakizaka; Takao Ueno, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 32 days.

(21) Appl. No.: 09/740,998

(22) Filed: Dec. 21, 2000

(30) Foreign Application Priority Data

Dec. 24, 1999 (JP) .......................................... 11-366104

(51) Int. Cl.⁷ ............................................. F16D 33/16
(52) U.S. Cl. ......................... 464/24; 192/3.3; 464/185
(58) Field of Search .................. 464/24, 185; 192/3.3, 192/3.29; 477/475; 474/28, 18

(56) References Cited

U.S. PATENT DOCUMENTS

| | | | | |
|---|---|---|---|---|
| 2,815,684 A | * | 12/1957 | Roche .......................... | 192/3.29 |
| 3,068,974 A | * | 12/1962 | Jandasek ..................... | 192/3.3 |
| 3,253,684 A | * | 5/1966 | Maurice ....................... | 192/3.29 |
| 3,497,043 A | * | 2/1970 | Leonard ....................... | 192/3.29 |
| 3,893,551 A | * | 7/1975 | Ahlen .......................... | 192/3.33 |
| 3,937,103 A | * | 2/1976 | Kleinhans ..................... | 74/572 |
| 4,002,228 A | * | 1/1977 | Borman ....................... | 192/3.29 |
| 4,335,587 A | * | 6/1982 | Thomamueller et al. ..... | 403/223 |
| 4,716,998 A | * | 1/1988 | Tsukamoto et al. ........... | 192/3.3 |
| 4,974,715 A | * | 12/1990 | Koyama ...................... | 192/3.29 |
| 5,400,884 A | * | 3/1995 | Matsuoka .................... | 192/3.25 |

FOREIGN PATENT DOCUMENTS

JP               2-40904        9/1990

* cited by examiner

Primary Examiner—Lynne H. Browne
Assistant Examiner—Kenn Thompson
(74) Attorney, Agent, or Firm—Armstrong, Westerman & Hattori, LLP (57) ABSTRACT

In a stator shaft made by press-fitting a shaft member into a press-fit bore of a flange member, first oil passages having openings in an outer circumferential surface of the shaft member are formed therein, and plural flow passage-forming bores are formed in the flange member so as to extend from outer circumferential surfaces of a flange portion and through the press-fit bore, the shaft member being press-fitted into the press-fit bore so that inner end openings (openings joined to the press-fit bore) of the flow passage-forming bores are opposed to and communicated with the openings of first flow passages, whereby the first and second flow passages are communicated with each other. In this structure, the plural flow passage-forming bores are formed so as to extend in parallel with each other.

5 Claims, 6 Drawing Sheets

FLOW PASSAGE STRUCTURE FOR SHAFT-PRESS-FITTED FLANGE MEMBERS

FIELD OF THE INVENTION

This invention relates to a flow passage structure formed by press-fitting a shaft member into a press-fit bore provided in a flange member so as to be opened at one axial end thereof, and thereby communicating with each other flow passages formed in the flange member and those formed in the shaft member.

BACKGROUND OF THE INVENTION

Figure 6:
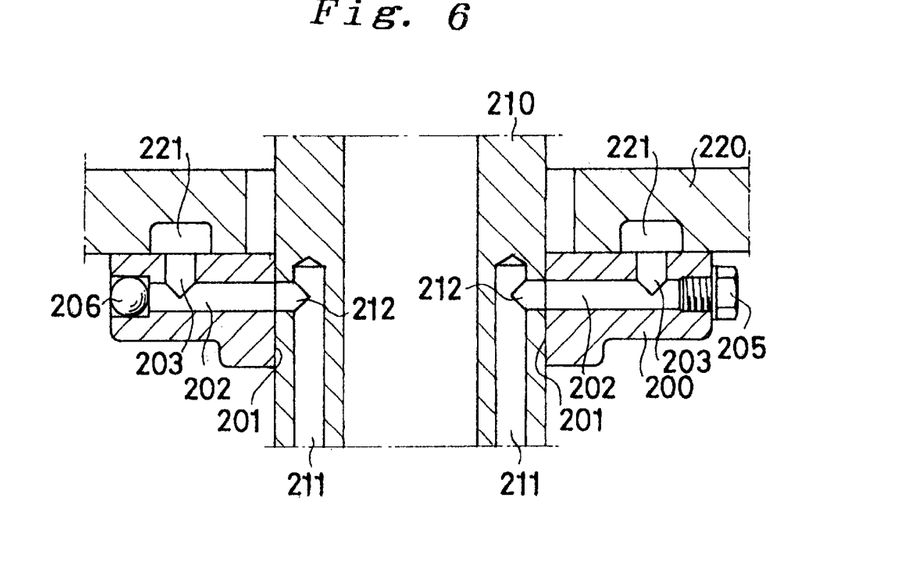
FIG. 6 is a sectional view showing a related art flow passage structure for shaft-press-fitted flange members.
Figure 7:
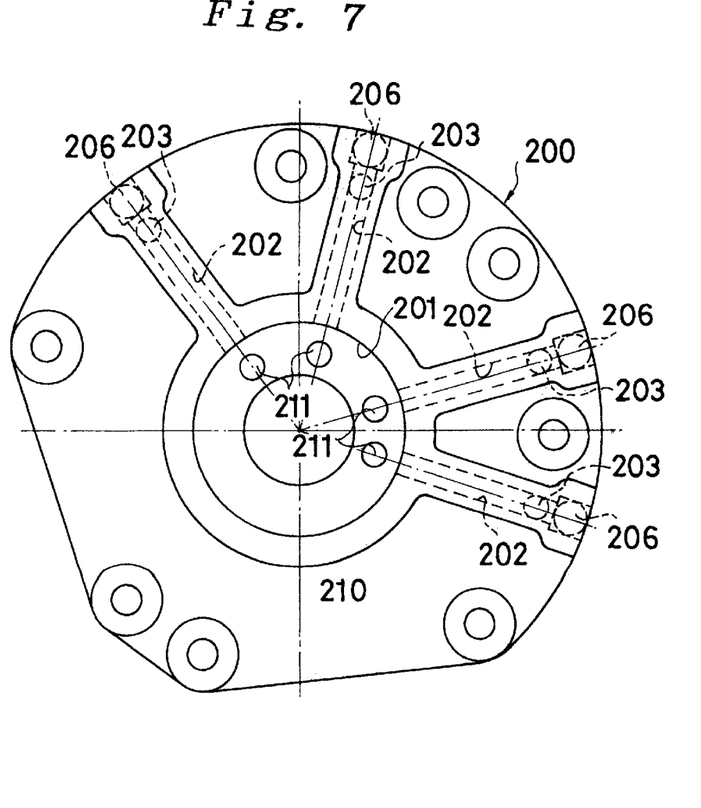
FIG. 7 is a sectional view showing a related art flow passage structure for shaft-press-fitted flange members.

Such a flow passage structure is used for a support flange member of a fluid joint, and a support flange of a stator member of a torque converter as disclosed in, for example, Japanese Patent Publication No. 40904/1990. An example of such a related art flow passage structure for a shaft-press-fitted flange member is shown in FIGS. 6 and 7. This structure is formed by press-fitting a shaft member 210 into a press-fit bore 201 of a flange member 200 so as to communicate an oil passage 221 in a housing 220, to which the flange member 200 is fixed, and shaft-side radial bores 212, which are formed in the shaft member 210, with each other via an inside-flange flow passage including flange side radial bores 202 and flange side axial bores 203 which are formed in the flange member 200. The inside-shaft radial bores 212 are joined to axially extending inside-shaft axial bores 211, and these axial bores 211 are jointed to, for example, the interior of a torque converter. This enables the supplying of an oil from the oil passages 221 of the housing 220 to the interior of a torque converter and the discharging of the oil from the latter to the former to be done.

As described above, in the flow passage structure, flange side flow passages are formed of flange side radial bores 202 made so as to extend from an outer circumferential surface of a flange member and through a press-fit bore 201, and flange side axial bores 203 made so as to extend from a side surface of the flange member and communicate with the flange side radial bores 202. The flange side radial bores 202 are closed at the portions thereof which are in the outer circumferential surface of the flange member 200 with plugs 25, or with balls 206 press-fitted thereinto.

Generally speaking, plural flange side flow passages are formed in many cases, and, in such cases, plural flange side radial bores 202 and plural flange side axial bores 203 are formed. These plural flange side radial bores 202 are formed from an axial portion of the flange member so as to extend in the radially outward direction, for example, as shown in FIG. 6. However, such radial bores 202 are formed by drilling, and the indexing of an angular position thereof is required every time one axial bore 203 is formed, so that the processing efficiency (productive efficiency) is low. When the bores 202 extend radially in this manner, the flange side axial bores 203 formed at radially outer end portions of the radial bores 202 are positioned away from one another, and the arrangement of oil passages (oil passages 221 of a housing 220) to which these axial bores 203 are joined, and a hydraulic circuit (for example, a hydraulic control valve) formed on these oil passages is limited. Furthermore, when the flange member of such a construction is fixed to the housing 220, the flange member and housing have to be combined with each other by bolts so that each axial bore 203 is positioned between adjacent bolts as shown in FIG. 7, for the purpose of preventing an oil from leaking from joint surfaces of the flange member and housing. This causes the number of the bolts to increase, a utilizable space to be narrowed, and the weight of the structure to increase.

SUMMARY OF THE INVENTION

The present invention has been made in view of the above circumstances, and provides a flow passage structure capable of easily carrying out a drilling operation for the formation of flow passages made of radial bores in a flange member, and arranging axial bores, which are joined to the radial bores, close to one another.

The present invention is directed to a flow passage structure for a shaft-press-fitted flange member (for example, a stator shaft 40 in a mode of embodiment) formed by press-fitting a shaft member (for example, a shaft member 41 in the mode of embodiment) into a press-fit bore (for example, a press-fit bore 141 formed in a flange member 42 in the mode of embodiment), in which the shaft member 42 is provided with first flow passages (for example, oil passages 102 in the mode of embodiment) having openings (for example, right end portions 106 of the oil passages 102 in the mode of embodiment) in an outer circumferential surface thereof, the flange member being provided with plural flow passage-forming bores (for example, oil passages 101 in the mode of embodiment) made from outer circumferential surfaces (for example, outer circumferential surfaces 43b, 43c in the mode of embodiment) thereof so as to extend through the press-fit bore, the shaft member being press-fitted into the press-fit bore so that inner end openings (openings joined to the press-fit bore) of the flow passage-forming bores are opposed to and communicated with openings of the first flow passages, whereby the first and second flow passages are communicated with each other with the plural flow passage-forming bores extending in parallel with one another.

In the case of the flow passage structure formed in this manner, plural flow passage-forming bores extend from the outer circumferential surfaces of the flange member in parallel with each other, so that the indexing of rotational positions during the drilling of the flow passage-forming bores is not needed, i.e., the formation of these bores can be carried out easily. Especially, plural flow passage-forming bores can be formed at once by using plural drills, so that the processing efficiency is high. Since the flow passage-forming bores extend in parallel with each other, the flange-side axial bores communicating therewith can be positioned close to one another, and a hydraulic circuit (for example, a hydraulic control valve) to which these axial bores are connected can be arranged or formed compactly. Furthermore, the fixing of the flange member to a housing can be done by only combining these parts with each other by bolts so that each of the plural axial bores is positioned between adjacent bolts. This enables the number of necessary bolts to be reduced, a space between the joint surfaces of the flange member and housing to be utilized effectively, and the weight of the structure to be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENT

A preferred mode of embodiment of the flow passage structure for shaft-press-fitted flange members according to the present invention will now be described with reference to the drawings. In the embodiment to be described below, the shaft-press-fitted flange member in the present invention is used as a stator shaft supporting a stator of a torque converter. First, a non-stage vehicular transmission using this torque converter will now be described briefly with reference to FIG. 1.

Figure 1:
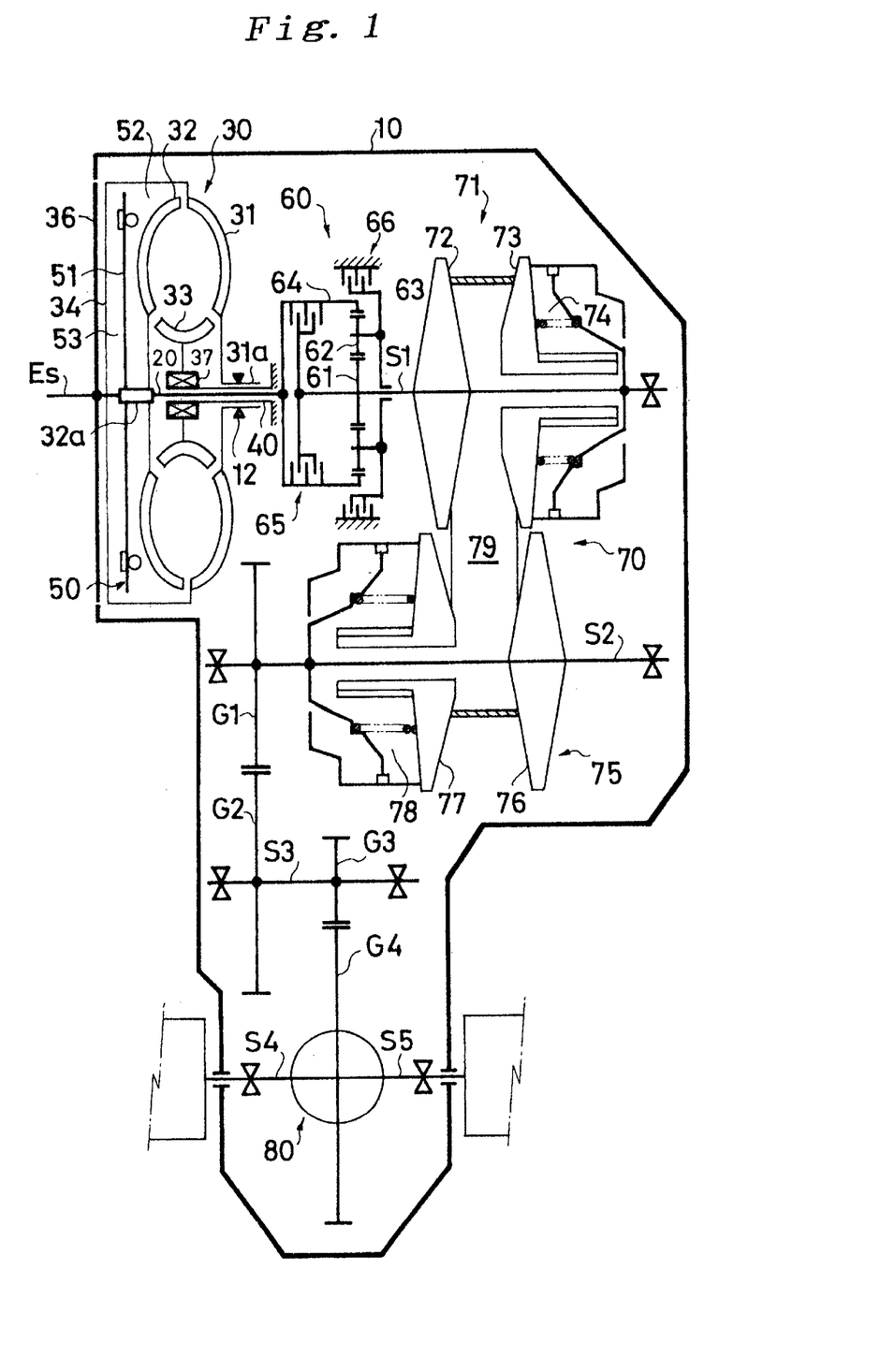
FIG. 1 is a schematic diagram showing the construction of a non-stage vehicular transmission formed by using the shaft-press-fitted flange member in the present invention for a stator shaft.

This transmission is held in a transmission case 10, and an input shaft 20, a primary shaft S1, a secondary shaft S2, a countershaft S3, and left and right axle shafts S4, S5 are supported rotably via bearings fixed to the transmission case 10. In this transmission, the input shaft 20 and primary shaft S1 are provided coaxially, and the secondary shaft S2 is positioned in parallel with and a predetermined distance away from the input shaft 20 (or the primary shaft S1). The countershaft S3 is positioned in parallel with and a predetermined distance away from the secondary shaft S2, and the left and right axle shafts S4, S5 are provided coaxially, and positioned in parallel with and a predetermined distance away from the countershaft S3.

Into the input shaft 20, the power from an engine (not shown) is inputted via a torque converter 30. The torque converter 30 has a pump impeller 31, a turbine runner 32 and a stator 33, and the pump impeller 31 is made integral with a converter cover 34, which covers an outer circumference thereof, and mounted fixedly on a crankshaft Es of the engine via a drive plate 36 to which a stator gear is fixedly mounted. Turbine runner 32 is combined with the input shaft 20 via a turbine runner hub 32a, and the stator 33 is fixed to a stator shaft 40 via a one-way clutch 37.

This stator shaft 40 corresponds to the shaft-press-fitted flange member according to the present invention. As shown in detail in FIGS. 2 and 3, the shaft member 41 (corresponding to the shaft member defined in the Claims) positioned on an outer circumferential side of the input shaft 20 and mounted fixedly with a stator 33 (and one-way clutch 37), and a flange member 42 into which the shaft member 41 is press-fitted to be formed into a unitary structure therewith constitute a stator shaft 40. The flange member 42 has a press-fit bore 141 into which the shaft member 41 is press-fitted, and a flange portion 43, and is fixed at the flange portion 43 to a partition wall 11 of the transmission case 10 by bolts B, whereby the stator shaft 40 is fixed.

Figure 2:
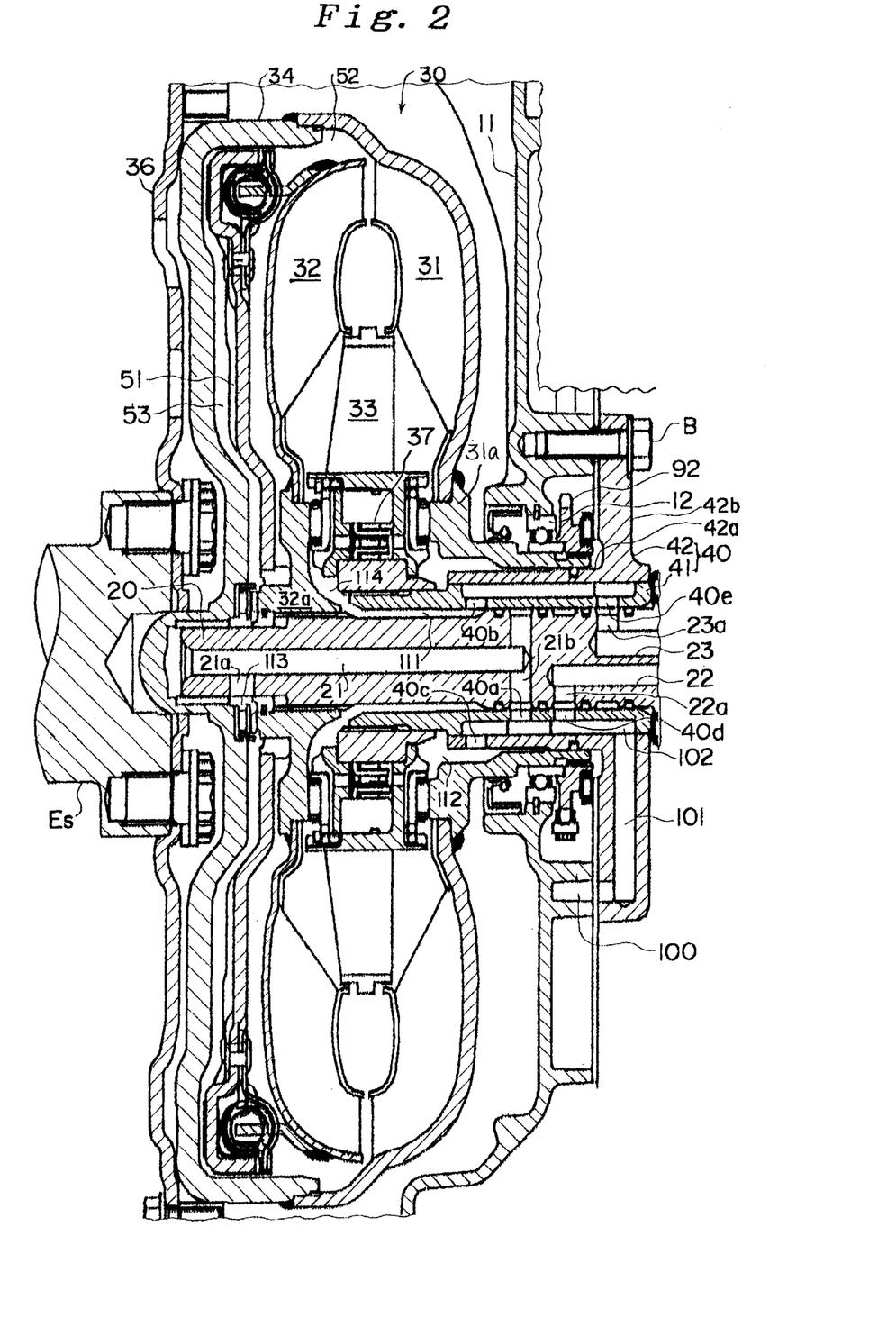
FIG. 2 is a sectional view showing on an enlarged scale a portion around a torque converter of the same non-stage vehicular transmission.

The pump impeller 31 is combined with a left end portion of a boss member 31a positioned on an outer circumferential surface of the flange member 42, and an outer circumferential surface of this boss member 31a is supported rotatably via a bearing 12 provided on the partition wall 11. Therefore, the input shaft 20, stator shaft 40 and boss member 31a are in a coaxially positioned condition.

A pump drive gear 92 is mounted fixedly on a right end portion of the boss member 31a, and connected via a chain to a pump driven gear mounted on a rotor shaft of an oil pump (vane pump). Therefore, when an engine is rotated, the pump impeller 31 and boss member 31a are rotated to cause the oil pump to be driven via a chain. An oil discharged from the oil pump is supplied to various portions in the transmission via a predetermined oil passage.

The torque converter 30 is provided with a lockup mechanism 50 adapted to press a lockup clutch piston 51, which is fixed to the turbine runner hub 32a, against an inner surface of the converter cover 34 and engage these two members 51, 34 with each other, whereby the power from the engine can be transmitted directly to the input shaft 20. Such an operation of the lockup clutch piston 51 is carried out by supplying and discharging an oil to and from two oil chambers, which are formed by partitioning a space in the torque converter 30 into two by the lockup clutch 51, i.e. an oil chamber 52 (which will be called a turbine side oil chamber 52) formed closer to the turbine runner 32 than to the lockup clutch 51, and an oil chamber (which will be called a cover side oil chamber 53) formed closer to the converter cover 34 than to the lockup clutch piston 51. An oil passage structure for supplying an oil to the two oil chambers 52, 53 thus formed and discharging the oil therefrom shows an example of the flow passage structure according to the present invention, the details of which will be described later.

The power of the input shaft 20 is transmitted to the primary shaft S1 via a forward and backward movement change-over mechanism 60. As shown in FIG. 2, the forward and backward movement change-over mechanism 60 is formed of a sun gear 61 mounted fixedly on the primary shaft S1, plural pinion gears 62 engaged with the sun gear 61 from an outer side thereof, a carrier 63 rotatable with respect to the primary shaft S1 and supporting the plural pinion gears 62 rotatably, and a ring gear 64 mounted fixedly on the input shaft 20 and engaged with the plural pinion gears 62 from an inner side thereof. The primary shaft S1 and ring gear 64 can be engaged with each other by hydraulically operating a forwarding clutch 65, and the carrier 63 and transmission case 10 by hydraulically operating a backing brake 66.

When the forwarding clutch 65 is engaged with the backing brake 66 disengaged, the input shaft 20, ring gear 64, pinion gears 62, sun gear 61 and carrier 63 are rotated together, so that the primary shaft S1 is rotated in the same direction as the input shaft 20. When the forwarding clutch 65 is disengaged with the backing brake 66 engaged, the rotation of the input shaft 20 is transmitted to the sun gear 61 by the carrier 63 via the pinion gears 62, to which rotary shafts are fixed, so that the primary shaft S1 is rotated in the direction opposite to the direction of rotation of the input shaft 20.

The power of the primary shaft S1 is transmitted to the secondary shaft S2 via a belt type non-stage transmission 70 formed of a driving pulley 71 mounted on the primary shaft Si, a driven pulley 75 mounted on the secondary shaft S2, and a metal V-belt 79 passed around these two pulleys 71, 75.

The driving pulley 71 is formed of a fixed half pulley body 72 mounted fixedly on the primary shaft S1, and a movable half pulley body 73 mounted on the primary shaft S1 so that the movable half pulley body 73 is opposed to the fixed half pulley body 72 and can be moved slidingly thereon in the axial direction. A distance (pulley width) between the fixed half pulley body 72 and movable half pulley body 73 can be varied by moving the movable half pulley body 73 by supplying an oil to the interior of a hydraulic cylinder 74 and discharging the oil therefrom. The driven pulley 75 is formed of a fixed half pulley body 76 mounted fixedly on the secondary shaft S2, and a movable half pulley body 77 mounted on the same shaft S2 so that the movable half pulley body 77 is opposed to the fixed half pulley body 76 and can be moved slidingly thereon in the axial direction. A distance (pulley width) between the fixed half pulley body 76 and movable half pulley body 77 can be varied by supplying an oil to the interior of a hydraulic cylinder 78 and discharging the oil therefrom. A radius of winding of the metal V-belt 79 can be varied by regulating a width of these two pulleys, and this enables the non-stage variation of a gear ratio of one of the two shafts S1, S2 to the other to be attained.

The power inputted into the secondary shaft S2 is transmitted to the countershaft S3 via gears G1, G2, and further to a differential mechanism 80 via a final drive gear G3 and a final driven gear G4. In the differential mechanism 80, the input power is transmitted in a divided state to left and right front axle shafts S4, S5 to drive left and right wheels (front wheels) (not shown) provided on respective end portions of the two shafts S4, S5.

Thus, in this transmission, the power of the engine inputted into the input shaft 20 via the torque converter 30 is transmitted to the left and right front wheels via the forward and backward movement change-over mechanism 60 and belt-type non-stage transmission 70, whereby a vehicle can travel. An arbitrary gear ratio can be obtained in a non-stepped manner by operating the belt type non-stage transmission 70 in the above-described manner. The switching of the direction in which the vehicle travels is done by an operation of the forward and backward movement change-over mechanism 70.

A detailed construction of the stator shaft 40 using the flow passage structure according to the present invention will now be described. First, as shown in FIG. 2, the input shaft 20 is provided therein with first to third oil passages 21, 22, 23 which constitute oil supply and discharge passages. The first oil passage 21 is an oil passage for supplying an oil to the cover side oil chamber 53 of the converter 30 and discharging the oil from the latter to the former, and this oil passage 21 is provided at left and right end portions thereof with opened oil passages 21a, 21b. The second and third oil passages 22, 23 are oil passages for supplying an oil to the forward and backward movement change-over mechanism 60 and belt type non-stage transmission 70 and discharging the oil from the latter to the former. Therefore, an oil passage 22a communicates with the second oil passage 22, and an oil passage 23a the third oil passage 23. The oil is supplied from these oil passages 22a, 23a to the forward and backward movement change-over mechanism 60 and belt type non-stage transmission 70, and discharged from the latter to the former. Accordingly, an oil passage 22a communicates with the second oil passage 22, and an oil passage 23a the third oil passage 23, and the oil is supplied from these oil passages 22a, 23a to the forward and backward movement change-over mechanism 60 and belt type non-stage transmission 70, and discharged from the latter to the former.

Figure 3:
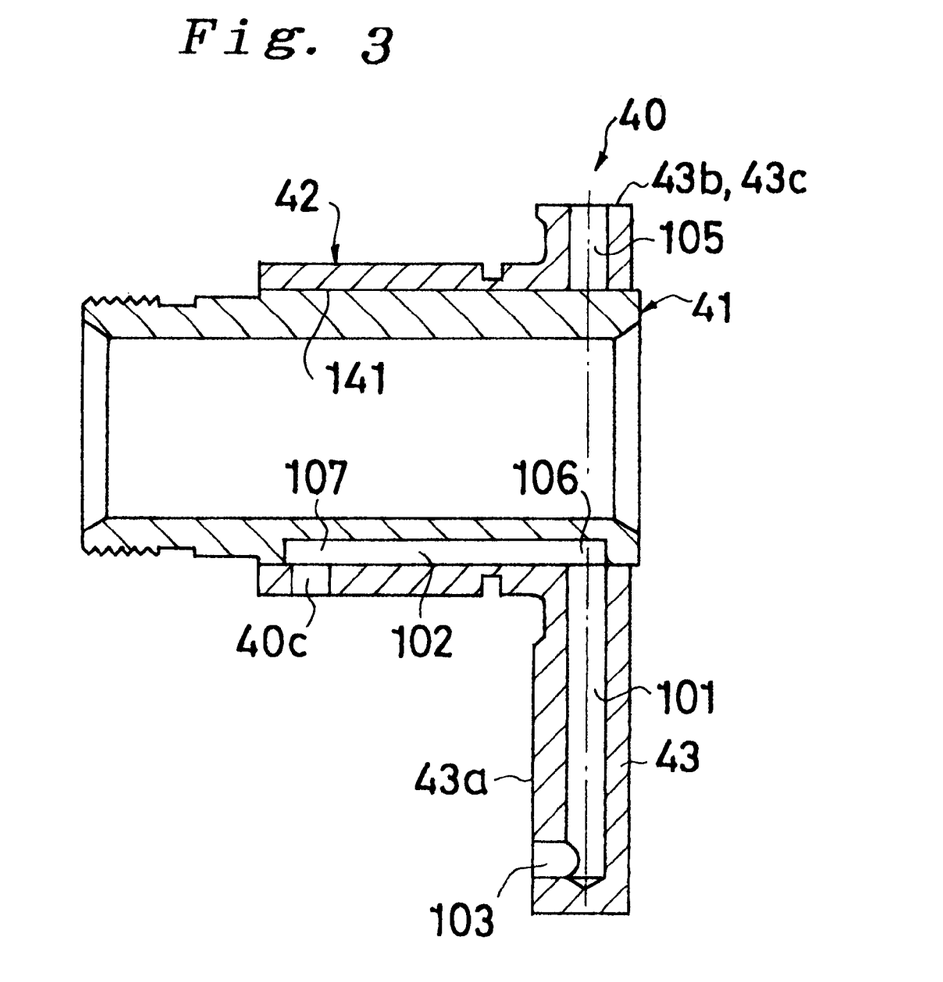
FIG. 3 is a sectional view showing a stator shaft of the same torque converter.
Figure 4:
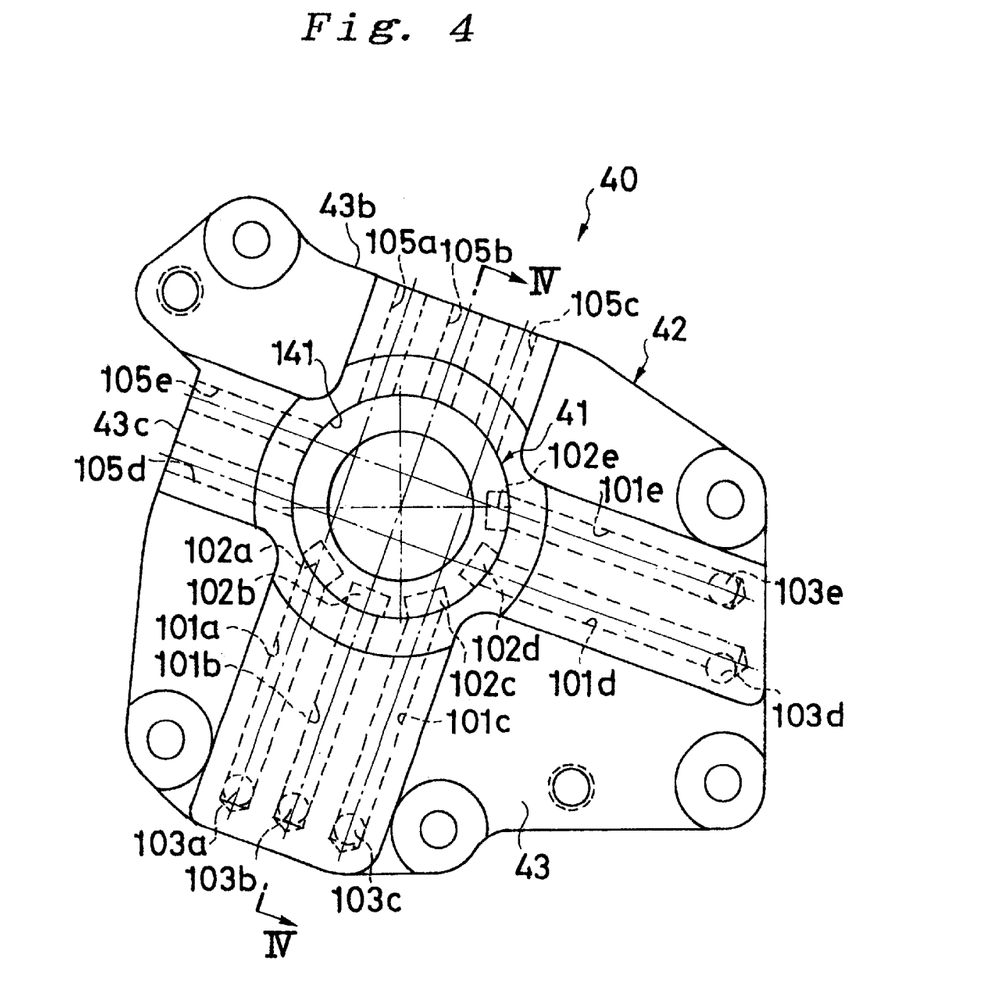
FIG. 4 is a side view showing the stator shaft of the same torque converter.

As is understood from FIGS. 3 and 4 as well, the stator shaft 40 is provided in the flange member 42 (flange portion 43) thereof with five oil passages 101a, 101b, 10c, 101d, 101e (representatively shown by the oil passages 101 in FIGS. 2 and 3) extending at right angles to a shaft axis. Five oil passages 102a, 102b, 102c, 102d, 102e (representatively shown by the oil passages 102 in FIGS. 2 and 3) communicating with these oil passages 101a–101e respectively are formed between an outer circumferential surface of the shaft member 41 and an inner circumferential surface of the flange member 41. Furthermore, five oil passages 103a, 103b, 103c, 103d, 103e (representatively shown by the oil passages 103 in FIGS. 2 and 3) are formed which extend axially from a side surface 43a of the flange portion 43 of the flange member 42 and communicate with the five oil passages 101 (101a, 101b, 101c, 101d, 101e) respectively. In this structure, the oil passages 102 correspond to first flow passages defined in the Claims, and the oil passages 101, 103 formed in the flange member 42 the second oil passages defined in the Claims. In this example, first and second flow passages including five flow passages each are formed, and opposed first and second flow passages communicate with each other to form five independent flow passages.

The shaft member 41 is provided with oil passage openings 40a, 40b, 40d, 40e constituting outlet ports of the oil passages 102a, 102b, 102d, 102e, and the flange member 42 an oil passage opening 40c constituting an outlet port of the oil passage 102c. The oil passage opening 40a communicates the oil passage 102a and the communication oil passage 21b of the first oil passage 21 with each other. The oil passage opening 40b communicates with each other the oil passage 102b and an oil passage space 111 formed between the input shaft 20 and the shaft member 41 of the stator shaft 40. The oil passage opening 40c communicates with each other the oil passage 102c and a space 112 formed between the stator shaft 40 and boss member 31a, and the oil passage opening 40d the oil passage 102d and the communication oil passage 22a of the second oil passage 22. The oil passage opening 40e communicates the oil passage 102e and the communication passage 23a of the third oil passage 23 with each other.

The five oil passages 103 (103a, 103b, 103c, 103d, 103e) formed in the flange portion 43 of the flange member 42 communicate respectively with five oil supply ports 100a, 100b, 100c, 10d, 100e (representatively shown by the oil supply ports 100 in FIG. 3) formed in the transmission case 10, whereby the supplying of corresponding oils is done. Consequently, predetermined oils are supplied to predetermined parts respectively to carry out the lubrication of oil in the interior of the torque converter, and the controlling of the operations of the lockup clutch, forward and backward movement change-over mechanism 60 and non-stage transmission 70.

The oil passages used to carry out the supplying of these five different oils are formed in the stator shaft 40 as mentioned above. The construction of these oil passages will now be described in detail with reference to FIGS. 3 and 4.

As is understood from the two drawings, the oil passages 101 are formed of processed drill bores extending from the outer circumferential surfaces 43b, 43c of the flange member 43 at right angles to a shaft axis. These drill bores have three blind bores extending side by side in parallel with one another from the outer circumferential surface 43b in the direction which is at right angles to the shaft axis, further through the press-fit bore 141, into which the shaft member 41 is to be press-fitted, and then toward the opposite side of one of the mentioned outer circumferential surfaces, which is beyond the press-fit bore 141 but within the flange portion 43; and two blind bores extending side by side in parallel with each other from the outer circumferential surface 43c in the direction which is at right angles to the shaft axis, further through the press-fit bore 141, into which the shaft member 41 is to be press-fitted, and then toward the opposite side of the outer circumferential surface 43c beyond the press-fit bore 141 but within the flange portion 43. As shown in the drawing, in three drill bores formed so as to extend from the outer circumferential surface 43b, inlet portions thereof, which extend from the outer circumferential surface 43c to the press-fit bore 141, are represented by numbers 105a, 105b, 105c, while rear portions of the same drill bores which extend through the press-fit bore 141 toward the opposite portion of the surface 43b constitute the above-mentioned oil passages 101a, 101b, 101c. Similarly, in the two drill bores formed so as to extend from the outer circumferential surface 43c, inlet portions extending from the outer circumferential surface 43c to the press-fit bore 141 are represented by numbers 105d, 105e, while rear portions of the drill bores which extend through the press-fit bore 141 toward the opposite portion of the surface 43c constitute the above-mentioned oil passages 101d, 101e.

After the five blind bores are thus formed, the shaft member 41 is press-fitted into the press-fit bore 141 as shown in the drawings. The shaft member 41 is provided in an outer circumferential surface thereof with five axially extending grooves, which are covered with the flange member 42 with the shaft member press-fitted in the press-fit bore 141, to form the above-mentioned oil passages 102 (102a, 102b, 102c, 102d, 102e). in the condition in which the shaft member 41 is thus press-fitted in the press-fit bore, right end portions 106 (106a, 106b, 106c, 106d, 106e) of the oil passages communicate with the oil passages 101 (101a, 101b, 101c, 101d, 101e) formed of the rear portions of the drill bores. Left end portions 107 (107a, 107b, 107c, 107d, 107e) of the oil passages communicate with the oil passage openings 40a, 40b, 40c, 40d, 40e formed in the shaft member 41 or the flange member 42 as mentioned above.

As a result, the first flow passages provided in the shaft member 41 and formed of the oil passages 102 communicate with the second flow passages provided in the flange member 42 and formed of the oil passages 101, 103, whereby five independent oil passages are formed. In this structure, the rear portions of the drill bores formed from the outer circumferential surface of the flange member 43 communicate directly with the oil passage of the press-fitted inner cylindrical member 41, and the inlet portions 105a–105e do not specially require to be closed, so that the drill bores are easily formed with members for closing these inlet portions therewith becoming unnecessary.

Figure 5:
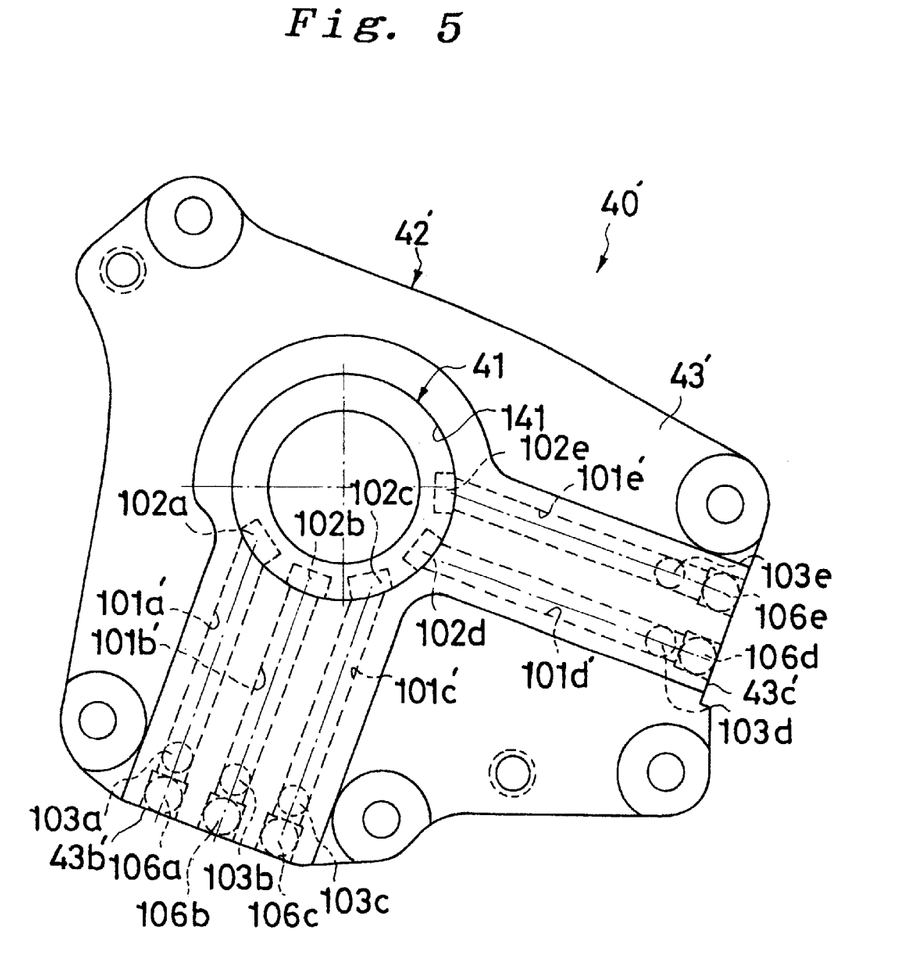
FIG. 5 is a side view showing a different example of the stator shaft of the same torque converter.

The present invention is not limited to the above-described construction, and it may have the construction shown in FIG. 5. A stator shaft 40' shown in FIG. 5 is formed by press-fitting a shaft member 41' identical with the above-described shaft member into a press-fit bore 141 of a flange member 42' which is different from the above-described flange member only at radially extending oil passages 101' (101a'–101e') thereof. The oil passages 101' are formed of two sets of drill bores 101a', 101b', 101c' and 101d', 101e' made from outer circumferential surfaces 43b', 43c' of the flange portion 43' of the flange member 42' so as to extend in parallel with each other, and through the press-fit bore 141. Radially outer end portions of the drill bores are closed with balls 106 (106a–106e) press-fitted thereinto to thereby form the oil passages 101'.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-366104 filed on Dec. 24, 1999, which is incorporated herein by reference.

What is claimed is:

1. A flow passage structure for shaft-press-fitted flange members, comprising:
    a flange member provided with a press-fit bore opened at at least one axial end thereof,
    a shaft member press-fitted in the press-fit bore, first flow passages formed in the shaft member and having openings in an outer circumferential surface thereof, and
    plural flow passage-forming bores formed so as to extend from an outer circumferential surface of the flange member and through the press-fit bore,
    the shaft member being press-fitted into the press-fit bore so that openings of the flow passage-forming bores at which the flow passage-forming bores communicate with the press-fit bore are opposed to and communicated with the openings of the first flow passages, whereby the first flow passages and flow passage-forming bores are communicated with each other,
    the plural flow passage-forming bores being formed so as to extend in parallel with each other.

2. A flow passage structure for shaft-press-fitted flange members according to claim 1, wherein:
    the flow passage-forming bores comprise blind bores extending linearly at right angles to a shaft axis from the outer circumferential surface of the flange member, and through the press-fit bore, and stopping at free end portions thereof in the interior of the flange member, and communication bores extending from a side surface of the flange member in the axial direction thereof, and communicating with the parts of the blind bores which extend from the press-fit bore to the free end portions thereof,
    the parts of the blind bores which extend from the press-fit bore to the free end portions thereof and the communication bores constituting second flow passages,
    the shaft member being press-fitted into the press-fit bore so that the parts of the blind bores in the second flow passages which open into the press-fit bore and the first flow passages communicate with each other, whereby the first and second flow passages are communicated with each other.

3. A flow passage structure for shaft-press-fitted flange members according to claim 2, wherein the flange member is formed of a cylindrical portion provided with the press-fit bore therein, and a flange portion extending from an end part of the cylindrical portion in the outer circumferential direction thereof, the blind bores being formed so as to extend from the outer circumferential surfaces of the flange portion in the direction which is at right angles to the shaft axis.

4. A flow passage structure for shaft-press-fitted flange members according to claim 3, wherein the flange member and shaft member constitute a stator shaft supporting a stator of a torque converter, the flange member being held fixedly.

5. A flow passage structure for shaft-press-fitted flange members according to claim 2, wherein the shaft member is formed to a hollow cylindrical body and press-fitted in the press-fit bore, the shaft member being provided with axially extending grooves in the outer circumferential surface thereof, the grooves being covered with the press-fit bore in the condition in which the shaft member is press-fitted in the press-fit bore, whereby the first flow passages are formed.

* * * * *